Patented Feb. 17, 1942

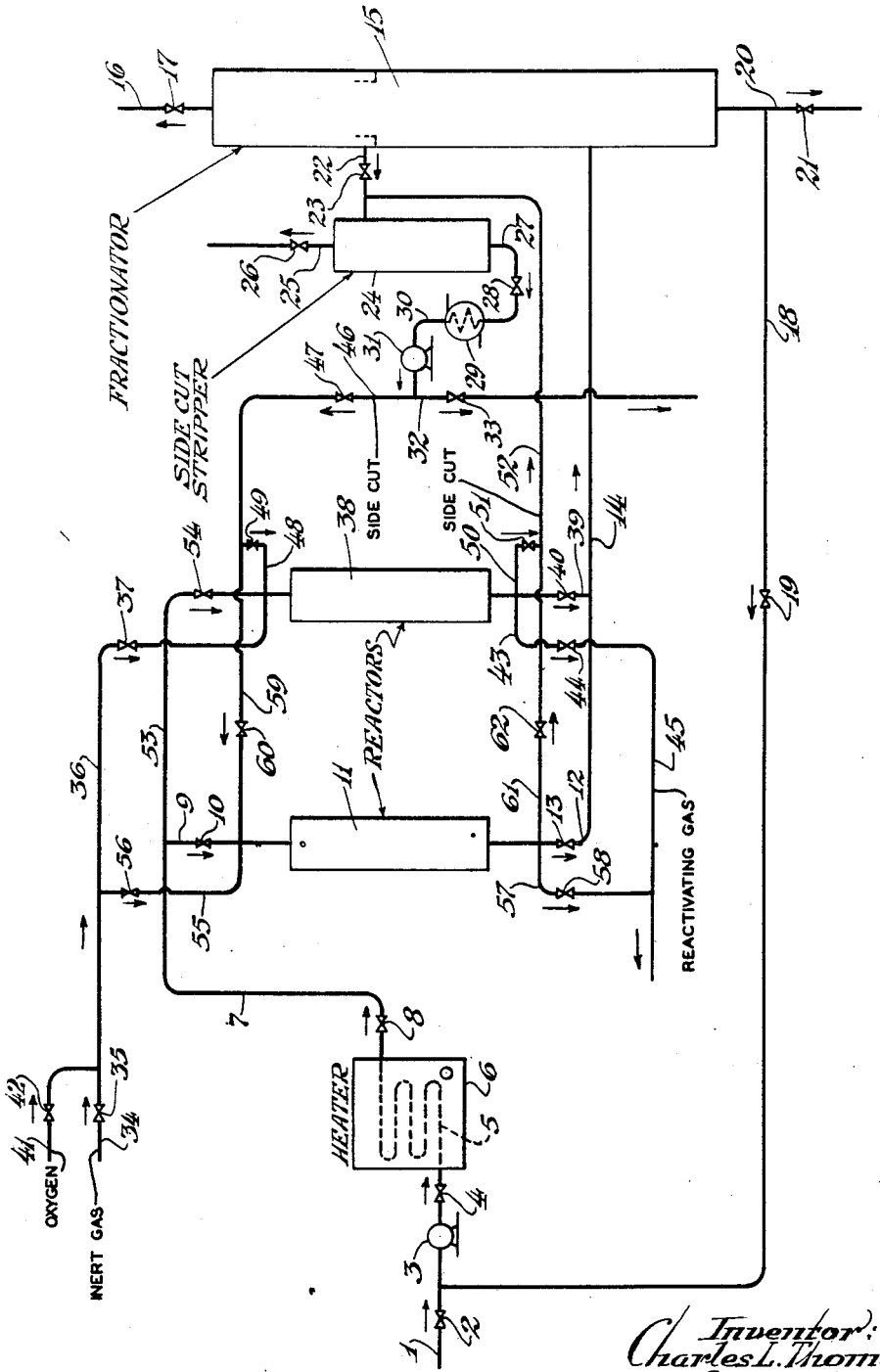

2,273,339

UNITED STATES PATENT OFFICE 2,273,339

CATALYTIC CRACKING

Charles L. Thomas, Chicago, Ill., assignor to Universal Oil Products Company, Chicago, Ill., a corporation of Delaware Application November 16, 1939, Serial No. 304,663

12 Claims. (Cl. 196—52)

This invention relates to a process for converting hydrocarbon oil into substantial yields of desirable products among which is motor fuel useful in aviation gasoline. Although the process may be adapted to any type of hydrocarbon oil, the oils processed are usually of petroleum origin and of such a character that they may be distilled at ordinary pressures without substantial decomposition. More particularly the invention concerns catalytic cracking or reforming in a temperature range of approximately 500–900° F. and pressures of approximately 50–1000 pounds per square inch.

Thermal non-catalytic cracking of high boiling hydrocarbon oils has been practiced and the reactions involved are fairly well understood. When using catalysts to assist the cracking reaction, the knowledge is less complete and as a consequence a discussion of these reactions is best confined to a factual basis.

Numerous catalytic materials have been used for converting hydrocarbon oils into gasoline and for reforming naphthas and gasolines to increase their antiknock properties. A detailed discussion of such catalytic materials is not necessary and it suffices to say that they include the reduced metal catalyst such as nickel, copper, cobalt, iron, etc., as well as certain oxide catalysts consisting largely of aluminum or magnesium oxide having deposited thereon relatively minor amounts of promoting compounds such as the oxides of chromium, molybdenum, vanadium, etc. Naturally occurring clays have been used and particularly clays which have been activated by treatment with acids or other chemicals.

A type of catalyst which has been found to have particular utility in cracking of hydrocarbon oils and which is especially adapted to the present process, comprises the so-called silica-alumina, silica-zirconia, silica-alumina-zirconia, etc. type of catalyst, which are, broadly speaking, precipitated composites of the component materials which have been washed to remove alkali metal ions, and have been dried and calcined to form finished catalytic masses. The composites may be made by simultaneous or separate precipitation of the component materials under controlled conditions.

The catalysts mentioned are not necessarily equivalent and some are more useful under some conditions than others.

The catalytic cracking of hydrocarbon oils has been carried out in the presence of the catalysts mentioned at temperatures ranging from 500–1200° F. and pressures substantially atmospheric to considerably superatmospheric, say of the order of 1000 pounds per square inch.

When processing at temperatures above 900° F. a relatively olefinic gasoline is obtained. When processing below 900° F. a substantially olefin-free motor fuel suitable for use in aviation gasolines may be produced. It is with improvements in process for producing substantially olefin-free gasoline that the present invention is concerned.

In one specific embodiment the present invention comprises a process for converting hydrocarbon oil into valuable products including gasoline suitable for aviation fuel, which consists in contacting said hydrocarbon oil in a primary reaction zone with a cracking catalyst at a temperature of 500–900° F. and a pressure of approximately 50–1000 pounds per square inch to produce a substantially olefin-free gasoline, separating the reaction products, fractionating them into gas, gasoline, an intermediate boiling side cut and a higher boiling portion of insufficiently converted oil, treating a spent catalyst in a secondary reaction zone with an oxygen containing gas at a temperature in excess of 900° F. until reactivation is substantially complete, returning the temperature of the reactivated catalyst to approximately that used for converting said hydrocarbon oil by passing through said catalyst bed a relatively cool portion of said intermediate boiling side cut of said reaction products.

One embodiment of the present invention is illustrated in the accompanying drawing which is diagrammatic and is not intended to limit the invention to any particular type of apparatus nor to the exact flow illustrated therein since numerous modifications are possible which may still be within the scope of the invention. No attempt has been made to proportion the equipment, nor has the drawing been made to any scale.

Referring to the drawing, hydrocarbon oil enters through line 1, valve 2, pump 3 and valve 4 to coil 5 which is disposed in heater 6. After being heated to a suitable reaction temperature and pressure, the oil passes through line 7, valve 8, line 9 and valve 10 to reactor 11. The reactor may consist of any suitable type of apparatus such as manifolded tubes, or a chamber having catalyst particles disposed therein. The oil passes through line 12, valve 13 and line 14 to fractionator 15. Gasoline and gas are removed through line 16 and valve 17 through stabilizers, condensers, etc., not shown in interests of simplifying the drawing. Insufficiently converted oil may be passed through line 18, valve 19 to line 1 and thus returned for further conversion. A portion of the oil may be withdrawn through line 20 and valve 21 to storage. A side cut of intermediate boiling range may be withdrawn through line 22 and valve 23 to side cut stripper 24. The boiling range of the side cut is not limited, although the initial boiling point is usually above 300° F. and the end point is of the order of not more than about 650–700° F. The side cut may be used as a blending fluid for ordinary motor fuel, in which case the boiling range will be approximately 300° F. to not more than 450° F. It may be used as a tractor fuel in which case the end-point may be somewhat higher, say of the order of 525–550° F. It may be used as a light furnace distillate, in which case the end-point may range from 600–650° F., but seldom higher. The low boiling material contained in the side cut is removed through line 25 and valve 26 and may be blended with the product from the cracking plant, or may be used for other motor fuel purposes. The side cut proper is removed from stripper 24 through line 27, valve 28, cooler 29, line 30, pump 31 to line 32, valve 33 and thence to storage. A portion of the side cut may be used following the reactivation step to be described more fully hereinafter.

During the time that reactor 11 is being used for processing, a duplicate reactor is being reactivated. The reactivation step proper consists in removing carbonaceous or hydrocarbonaceous deposits from the catalyst particles by means of an oxygen-containing gas at a temperature in excess of approximately 900° F. From an operating standpoint, the reactivation consists of a series of steps which will be apparent from the following description. At the end of the processing period, the catalytic reactor contains hydrocarbon oil and vapors which are of considerable value in the process. In order to prevent excessive losses, it is the practice to first reduce the pressure from the operating pressure to approximately atmospheric, and then substantially purge the catalyst of such hydrocarbons by passing a relatively inert gas such as flue gas and/or steam through the catalyst bed before introducing the oxygen-containing reactivation gas. In the present instance, inert gas, such as flue gas, may be introduced through line 34, valve 35, line 36, valve 37 to reactor 38. The recovered oil may be passed through line 39 and valve 40 to line 14 and thence to fractionator 15. At a predetermined interval, oxygen-containing gas is introduced through line 41 and valve 42. Valve 40 is closed and the reactivation gases pass through line 43 and valve 44 to line 45 and are vented to the atmosphere or recycled by means not shown. When the carbonaceous materials are sufficiently removed from the catalyst particles, the flow of reactivation gases is stopped by closing valve 37, and a portion or all of the side cut material from line 30 is passed through line 46, valve 47, line 48 and valve 49 to reactor 38, passing thence through line 50 and valve 51 to line 52 and thence to line 22 and side cut stripper 24. The cold oil is introduced for such a period of time as may be required to reduce the temperature of the catalyst in reactor 38 from the reactivation range to the approximate temperature of processing. The reactivation normally takes place at a temperature of about 1300° F. and the processing step is carried out at a temperature within the range of 500–900° F. During the period of cooling, the pressure on the system is increased from approximately atmospheric, which is that at which reactivation is normally carried out, to the pressure of processing which is usually of the order of 100–200 pounds per square inch, although pressures up to 1000 pounds per square inch may be employed. The period of purging, reactivation, cooling and repressuring is usually the same as that of processing, although a longer interval of time is sometimes used, in which case additional reactors are supplied to permit the variation in time. At the end of this phase of the cycle, the oil from line 7 is passed through line 53 and valve 54 to reactor 38. The side cut from line 30 is again removed through line 32, valve 47 being closed. Valve 10 is also closed. Reaction products from reactor 38 are removed through line 39, valve 40 and line 14 to fractionator 15. Reactor 11 is purged by passing inert gases from line 34 through line 55 and valve 56, the purged gases passing through line 12, valve 13 and line 14 to fractionator 15. The actual reactivation step is then carried out by introducing oxygen-containing gas through line 41, valve 42, line 55, valve 56 through reactor 11 and thence through line 57 and valve 58 to line 45. Cooling of the catalyst bed is accomplished by passing the side cut through line 46, valve 47, line 59 and valve 60 to reactor 11, and thence through lines 61, valve 62, line 52 and line 22 to side cut stripper 24. In this way a complete cycle of operation is obtained.

The side cut material used as a cooling medium is relatively refractory in so far as catalytic cracking is concerned, and as a consequence does not undergo much conversion during the passage over the catalyst during the cooling step. There are present in the oil, however, some hydrocarbons which undergo a certain amount of conversion so that some gasoline is formed, usually of the order of 8–10% of the side cut, and which is removed in the side cut stripper. Since this gasoline is relatively olefinic, it is usually used in motor fuel for consumption in automobiles. Since the substantially olefin-free gasoline produced by the main steps of the process is suitable for aviation fuel, it is usually not desirable to blend an olefin-containing gasoline with it.

It should be understood that the process is not limited to two reactors which is merely the minimum number which can be used in a continuous process of this kind. It is within the scope of the invention to use a larger number of reactors where this is found desirable from an operating standpoint.

The following example is given to illustrate the usefulness and practicability of the present invention, but should not be construed as limiting it to the exact conditions shown.

Mid-Continent gas oil was cracked in the presence of a silica-zirconia catalyst at a temperature of 800° F. and a pressure of 150 pounds per square inch. A side cut boiling in the range of 300–500° F. was removed. A major portion of the remaining insufficiently converted oil was recirculated. The gasoline produced had a 300° F. end-point and was substantially olefin-free. It had an octane number of 78 and was suitable for use in aviation motor fuel. The catalyst, after becoming spent, was reactivated at a temperature of 1300° F. maximum, using flue gas containing added oxygen. After reactivation was complete, the catalyst was cooled by means of a fractionator side cut to the reaction temperature, namely, 800° F. At the same time the pressure was increased from substantially atmospheric, which was used in the reactivation step, to the 150 pounds per square inch pressure of processing. By this means it was possible to reduce the time of cooling by approximately one-half that which was necessary when cooling the catalyst by means of cold reactivation gases. The side cut oil was used as a high antiknock tractor fuel, the gasoline was used in aviation blends, and a portion of the higher boiling insufficiently converted oil was used as a furnace oil.

I claim as my invention:

1. A process for converting hydrocarbon oil into substantial yields of desirable products including high antiknock gasoline which comprises contacting the charging oil in a primary reaction zone with a cracking catalyst under conditions of temperature and pressure adequate to effect substantial conversion thereof to gasoline and gas, fractionating the reaction products into gas, gasoline, and an intermediate boiling side cut fraction and a higher boiling fraction of insufficiently converted oil, contacting spent catalyst in a secondary reaction zone with an oxygen-containing gas at a temperature in excess of that used in said primary reaction zone to effect reactivation of said catalyst, cooling the reactivated catalyst in the secondary zone to the operating temperature used in said primary reaction zone by contacting it with a cooled portion of said intermediate boiling side cut fraction and then diverting the charging oil from said primary zone and introducing the same to said secondary zone for conversion therein.

2. A process for converting hydrocarbon oil into substantial yields of desirable products including high antiknock gasoline which comprises contacting the charging oil in a primary reaction zone with a cracking catalyst at a temperature within the range of 500–900° F. and a pressure of substantially atmospheric to 1000 pounds per square inch to produce a substantially olefin-free gasoline, fractionating the reaction products into gas, gasoline, an intermediate boiling side cut and a higher boiling portion of insufficiently converted oil, contacting spent catalyst in a secondary reaction zone with an oxygen-containing gas at a temperature in excess of approximately 900° F., cooling the reactivated catalyst in the secondary zone to a desired operating temperature in the range of 500–900° F. by contacting it with said intermediate boiling side cut of said reaction products, and then diverting the charging oil from said primary zone and introducing the same to said secondary zone for conversion therein.

3. A process for converting hydrocarbon oil into substantial yields of desirable products including high antiknock gasoline which comprises contacting the charging oil in a primary reaction zone with a cracking catalyst under conditions of temperature and pressure adequate to effect substantial conversion thereof to gasoline, fractionating the reaction products into gas, gasoline and intermediate boiling side cut fraction and a higher boiling portion of insufficiently converted oil, treating spent catalyst in a secondary reaction zone with an oxygen-containing gas at a temperature in excess of that used in said primary reaction zone to effect reactivation thereof, contacting the reactivated catalyst in the secondary zone with a cooled portion of said intermediate boiling side cut fraction, returning a portion of the insufficiently converted oil to said primary conversion stage for further conversion, periodically diverting the flow of said hydrocarbon oil from said primary reaction zone to said secondary reaction zone, and converting it therein to substantial yields of gasoline, fractionating the reaction products into gas, gasoline and intermediate boiling side cut fraction and a higher boiling portion of insufficiently converted oil, reactivating said catalyst in said primary reaction zone by treating it with an oxygen-containing gas at a temperature in excess of that used for catalytic cracking, cooling the reactivated catalyst in the primary zone to the operating temperature by contacting it with the cooled portion of said intermediate boiling side cut fraction and continuing to operate in the cyclic manner described.

4. The process as set forth in claim 1 wherein the cracking catalyst is selected from the group consisting of silica-alumina, silica-zirconia, and silica-alumina-zirconia.

5. The process as set forth in claim 1 wherein the initial boiling point of said side cut fraction is above approximately 300° F. and the end boiling point is below approximately 700° F.

6. A process for converting hydrocarbon oil into substantial yields of desirable products including high antiknock gasoline which comprises contacting the charging oil in a primary reaction zone with a cracking catalyst under conditions of temperature and pressure adequate to effect substantial conversion thereof into substantially olefin-free gasoline, fractionating the reaction products into gas, gasoline and an intermediate boiling side cut and a higher boiling fraction of insufficiently converted oil, recycling the insufficiently converted oil, removing said intermediate boiling side cut to a side cut stripper, separating the low boiling fraction, cooling and recovering the higher boiling fraction of said side cut, treating spent catalyst in a secondary reaction zone with an oxygen-containing gas to effect reactivation thereof, then cooling the reactivated catalyst in the secondary zone by contacting it with a portion of said higher boiling fraction from said side cut stripper in order to return the temperature of said catalyst from that of reactivation to that of processing, then diverting the charging oil from said primary zone and introducing the same to said secondary zone for conversion therein.

7. In a process for the catalytic conversion of hydrocarbon oil employing a pair of catalytic reactors each of which is alternately operated on a cycle comprising a processing step and a regenerating step, the processing step including passage of the charging oil through a reactor at conversion temperature and the regenerating step including passage of an oxygen-containing gas through a reactor at a temperature substantially in excess of said conversion temperature, the processing step being performed in one of the reactors while performing the regenerating step in the other reactor, the method which comprises fractionating the products of the processing step to separate therefrom gasoline and gas, heavy insufficiently converted oil and an intermediate side cut fraction, introducing to each reactor, following its regeneration and while it is still at a temperature above said conversion temperature, a sufficient quantity of said intermediate side cut fraction to cool the regenerated reactor to approximately the conversion temperature of the charging oil, and then passing the charging oil through the thus cooled regenerated reactor.

8. The method as defined in claim 7 further characterized in that said intermediate side cut fraction has an initial boiling point above 300° F. and an end boiling point below 700° F.

9. The method as defined in claim 7 further characterized in that said intermediate side cut fraction boils in the approximate range of 300–500° F.

10. In a process for the catalytic conversion of hydrocarbon oil employing a pair of catalytic reactors each of which is alternately operated on a cycle comprising a processing step and a regenerating step, the processing step including passage of the charging oil through a reactor at conversion temperature and the regenerating step including passage of an oxygen-containing gas through a reactor at a temperature substantially in excess of said conversion temperature, the processing step being performed in one of the reactors while performing the regenerating step in the other reactor, the improvement which comprises introducing to each reactor, following its regeneration and while it is still at a temperature above said conversion temperature, a cool light hydrocarbon distillate which is substantially completely vaporizable at said temperature above the conversion temperature, the amount of said distillate being sufficient to cool the regenerated reactor to approximately the conversion temperature of the charging oil, and then passing the charging oil through the thus cooled regenerated reactor.

11. The improvement as defined in claim 10 further characterized in that said distillate has an initial boiling point above 300° F. and an end boiling point below 700° F.

12. The improvement as defined in claim 10 further characterized in that said distillate boils in the approximate range of 300–500° F.

CHARLES L. THOMAS.